United States Patent [19]

Swoboda et al.

[11] Patent Number: 5,681,536

[45] Date of Patent: Oct. 28, 1997

[54] INJECTION LANCE FOR UNIFORMLY INJECTING ANHYDROUS AMMONIA AND AIR INTO A BOILER CAVITY

[75] Inventors: Duane P. Swoboda; Kevin A. Largis, both of Columbus; Wayne A. Bruns, Beatrice; Mark A. Jurgens, Pickrell; Raymond V. Kirby, Lincoln; Sidney S. Penner, Odell, all of Nebr.; Ronald M. Cheek, Fullerton; Bauke Van Kalsbeek, Santa Ana, both of Calif.

[73] Assignee: Nebraska Public Power District, Columbus, Nebr.

[21] Appl. No.: 644,646

[22] Filed: May 7, 1996

[51] Int. Cl.⁶ .......................... B01D 53/34; B01F 15/02
[52] U.S. Cl. .................. 422/168; 422/169; 422/172; 422/182; 110/345; 239/398; 366/178.1
[58] Field of Search ..................... 422/168.17, 171, 422/172, 182; 261/116; 366/178.1, 178.3; 239/318, 428.5, 434.5, 398; 110/345

[56] References Cited

U.S. PATENT DOCUMENTS

| | | | |
|---|---|---|---|
| 3,880,570 | 4/1975 | Marshall | 431/4 |
| 4,021,186 | 5/1977 | Tenner | 431/10 |
| 4,636,370 | 1/1987 | Dean et al. | 423/235 |
| 4,693,874 | 9/1987 | Hurst | 423/235 |
| 4,719,092 | 1/1988 | Bowers | 423/235 |
| 4,722,287 | 2/1988 | Anderson et al. | 110/263 |
| 4,803,059 | 2/1989 | Sullivan et al. | 423/235 |
| 4,811,555 | 3/1989 | Bell | 60/39.06 |
| 4,842,834 | 6/1989 | Burton | 423/235 |
| 4,853,193 | 8/1989 | Cahn et al. | 423/235 |
| 4,930,305 | 6/1990 | Bell | 60/39.06 |
| 4,950,473 | 8/1990 | Flockenhaus et al. | 423/235 |
| 4,951,579 | 8/1990 | Bell | 110/212 |
| 4,954,323 | 9/1990 | Sockell | 423/235 |
| 4,981,660 | 1/1991 | Leach | 423/235 |
| 4,985,218 | 1/1991 | DeVita | 423/235 |
| 4,992,249 | 2/1991 | Bowers | 423/235 |
| 5,017,347 | 5/1991 | Epperly et al. | 423/235 |
| 5,024,171 | 6/1991 | Krigmont et al. | 110/345 |
| 5,045,292 | 9/1991 | Rüegg et al. | 423/235 |
| 5,048,432 | 9/1991 | Hofmann et al. | 110/345 |
| 5,058,514 | 10/1991 | Mozes et al. | 110/345 |
| 5,069,886 | 12/1991 | Frey et al. | 423/237 |
| 5,098,680 | 3/1992 | Fellows et al. | 423/235 |
| 5,112,216 | 5/1992 | Tenn | 431/5 |
| 5,118,282 | 6/1992 | Reynolds et al. | 431/4 |
| 5,139,754 | 8/1992 | Luftglass et al. | 423/235 |
| 5,178,101 | 1/1993 | Bell | 122/4 D |
| 5,194,076 | 3/1993 | Myers et al. | 261/116 |
| 5,199,255 | 4/1993 | Sun et al. | 60/39.02 |
| 5,224,334 | 7/1993 | Bell | 60/274 |
| 5,229,090 | 7/1993 | Hofmann et al. | 423/235 |
| 5,238,657 | 8/1993 | Kuivalainen | 422/172 |
| 5,240,689 | 8/1993 | Jones | 423/235 |
| 5,252,298 | 10/1993 | Jones | 422/172 |
| 5,277,135 | 1/1994 | Dubin et al. | 110/345 |
| 5,281,403 | 1/1994 | Jones | 423/235 |
| 5,284,492 | 2/1994 | Dubin | 44/301 |
| 5,298,320 | 3/1994 | Geoffrey | 428/288 |
| 5,312,605 | 5/1994 | Levendis et al. | 423/210 |
| 5,315,941 | 5/1994 | Vetterick et al. | 110/345 |

(List continued on next page.)

*Primary Examiner*—Hien Tran
*Attorney, Agent, or Firm*—Zarley, McKee, Thomte, Voorhees & Sease; Dennis L. Thomte

[57] ABSTRACT

An injection lance for injecting a mixture of air and anhydrous ammonia into a boiler having a flue gas stream moving therethrough to reduce nitrogen oxides therein. The lance includes outer, intermediate and inner tubes. The outer end of the inner tube is in communication with a source of anhydrous ammonia while the outer end of the outer tube is in communication with a source of mixing air. The outer end of the intermediate tube sealably embraces the exterior surface of the inner tube so that air being introduced into the outer tube passes towards the inner end of the lance between the outer and intermediate tubes. The mixing air and the anhydrous ammonia are passed into the space between the inner tube and the intermediate tube and then are discharged from the lance through discharge nozzles or ports which extend from the interior of the intermediate tube to the exterior of the outer tube.

13 Claims, 4 Drawing Sheets

U.S. PATENT DOCUMENTS

| | | | |
|---|---|---|---|
| 5,342,592 | 8/1994 | Peter-Hoblyn et al. | 423/235 |
| 5,344,306 | 9/1994 | Brown et al. | 431/4 |
| 5,344,628 | 9/1994 | Martin | 423/235 |
| 5,362,462 | 11/1994 | Pham et al. | 423/235 |
| 5,399,325 | 3/1995 | von Harpe et al. | 423/235 |
| 5,437,851 | 8/1995 | MacInnis | 423/239.1 |
| 5,441,713 | 8/1995 | Dubin et al. | 423/235 |
| 5,453,257 | 9/1995 | Diep et al. | 423/235 |
| 5,468,460 | 11/1995 | Lin | 423/266 |
| 5,470,224 | 11/1995 | Bortz | 431/182 |
| 5,478,542 | 12/1995 | Chawla et al. | 423/235 |

INJECTION LANCE FOR UNIFORMLY INJECTING ANHYDROUS AMMONIA AND AIR INTO A BOILER CAVITY

BACKGROUND OF THE INVENTION

1. Field of the Invention

This invention relates generally to a nitrogen oxide (NOx) reduction process termed SNCR. More particularly, the injection lance of this invention is utilized for reducing NOx emitted from fossil fuel fired boilers. More particularly, the invention permits the uniform injection of reagent (anhydrous ammonia) and mixing air into the boiler's flue gas stream in a location which is near 1800° F.

2. Description of the Related Art

Selective, non-catalytic nitrogen oxide reduction (SNCR) processes have been used for many years to reduce the oxides of nitrogen in combustion processes. SNCR has been used for the reduction of NOx to meet regulatory limits by a chemical process after combustion has already taken place. Numerous NOx reduction methods modify the combustion process itself by installing new burners and burner-related equipment. On some boiler types, it is difficult, or impossible, to modify the combustion process equipment. It may also be desirable to lower NOx to levels below those obtainable by burner related equipment alone. In these cases, it may be desirable to reduce the NOx after it has been formed, rather than to attempt a different method of combustion.

In order to inject the SNCR reagent into the boiler, penetrations of the boiler must be accomplished. Penetrations require modifications to the boiler tubes and the penetrations are expensive. Minimizing the number of boiler penetrations is important to the cost of installation on a SNCR system.

SNCR utilizes a reagent to create a localized reducing atmosphere to convert nitrogen oxide in the boiler to a nitrogen molecule. Inasmuch as this chemical reagent must be continuously injected into the boiler cavity, minimizing the cost of the reagent is important to the cost of operation of the boiler's SNCR system. It has been found that anhydrous ammonia is a more economical reagent than most competing reagents in the SNCR process.

During the injection of the reagent into the boiler cavity, it is important that the reagent be uniformly mixed and thoroughly distributed in the boiler's flue gas stream at a temperature where the non-catalytic reduction reaction can occur. When injecting anhydrous ammonia into the boiler, it is important that it not come into contact with a hot surface which will cause it to begin to disassociate into nitrogen molecules, or will create even more nitrogen oxides when in the presence of oxygen.

When anhydrous ammonia is injected into the boiler flue gas stream as a vapor, the ammonia molecule is ready to begin the non-catalytic process without any vaporization which will reduce the formation of ammonia "slip" as an emission product. Previous testing has shown that ammonia also tends to create less nitrous oxide (N2O) which is included in the list of global warming gases.

In those situations where the anhydrous ammonia reagent is mixed with mixing air, it is important to reduce the amount of mixing air, since the mixing air tends to increase the amount of available oxygen. However, because the air is injected after the combustion process, it reduces the overall boiler efficiency.

Further, certain of the prior art utilizing reagent injection equipment does not permit the injection equipment to be inspected while the boiler is in service. This is especially true on coal fired boilers, because the reagent is injected into a flue gas stream which contains "sticky" ash particles which could plug the injection ports and render the SNCR process ineffective.

SUMMARY OF THE INVENTION

An injection lance is disclosed for injecting a mixture of air and anhydrous ammonia into a boiler having a flue gas stream moving therethrough to reduce the nitrogen oxides therein. The lance of this invention is movable into the boiler by means of a drive mechanism and may be moved by the drive means from the boiler to permit inspection of the lance at times. The lance of this invention comprises an elongated outer tube having closed inner and outer ends. The outer tube is in communication, adjacent its outer end, with a source of mixing air. An elongated inner tube, having inner and outer ends, is centrally positioned in the outer tube. The inner tube is in fluid communication, adjacent its outer end, with a source of anhydrous ammonia whereby the anhydrous ammonia will pass through the length of the inner tube for discharge from the inner end thereof. An intermediate tube, having inner and outer ends, is positioned in the outer tube between the inner tube and the outer tube. The outer end of the intermediate tube sealably embraces the inner tube inwardly of the location where the mixing air enters the outer tube so that mixing air passes towards the inner end of said outer tube and into the open inner end of the intermediate tube. A deflector is provided at the inner end of the inner tube for directing the anhydrous ammonia passing therefrom into the space between the inner tube and the intermediate tube so that the anhydrous ammonia will mix with the mixing air passing therethrough. A plurality of spaced-apart discharge ports or nozzles extend from the interior of the intermediate tube to the exterior of the outer tube so that the anhydrous ammonia-air mixture present between the inner tube and the intermediate tube will be discharged into the flue gas stream substantially transversely with respect to the flow of gas.

It is therefore a principal object of the invention to provide an improved injection lance for injecting a mixture of air and anhydrous ammonia into a boiler having a flue gas stream moving therethrough to reduce nitrogen oxides therein.

Yet another object of the invention is to provide an injection lance which efficiently mixes air and anhydrous ammonia so that the mixture may be directed into the flue gas stream passing through the boiler.

Still another object of the invention is to provide an injection lance which prevents the anhydrous ammonia from coming into contact with extremely hot surfaces.

Still another object of the invention is to treat a major quantity of the boiler's flue gas with only a single boiler penetration.

Still another object of the invention is to provide an injection lance comprising an outer tube, an inner tube and an intermediate tube positioned therebetween wherein the intermediate tube has an expansion joint mechanism provided thereon.

Still another object of the invention is to provide an injection lance which may be removed from the boiler, thus allowing inspection of the lance and its ports without interrupting the boiler operation.

Still another object of the invention is to provide an injection lance of the type described which may be installed on the boiler without extensive modification thereof.

These and other objects will be apparent to those skilled in the art.

DESCRIPTION OF THE PREFERRED EMBODIMENT

Figure 1:
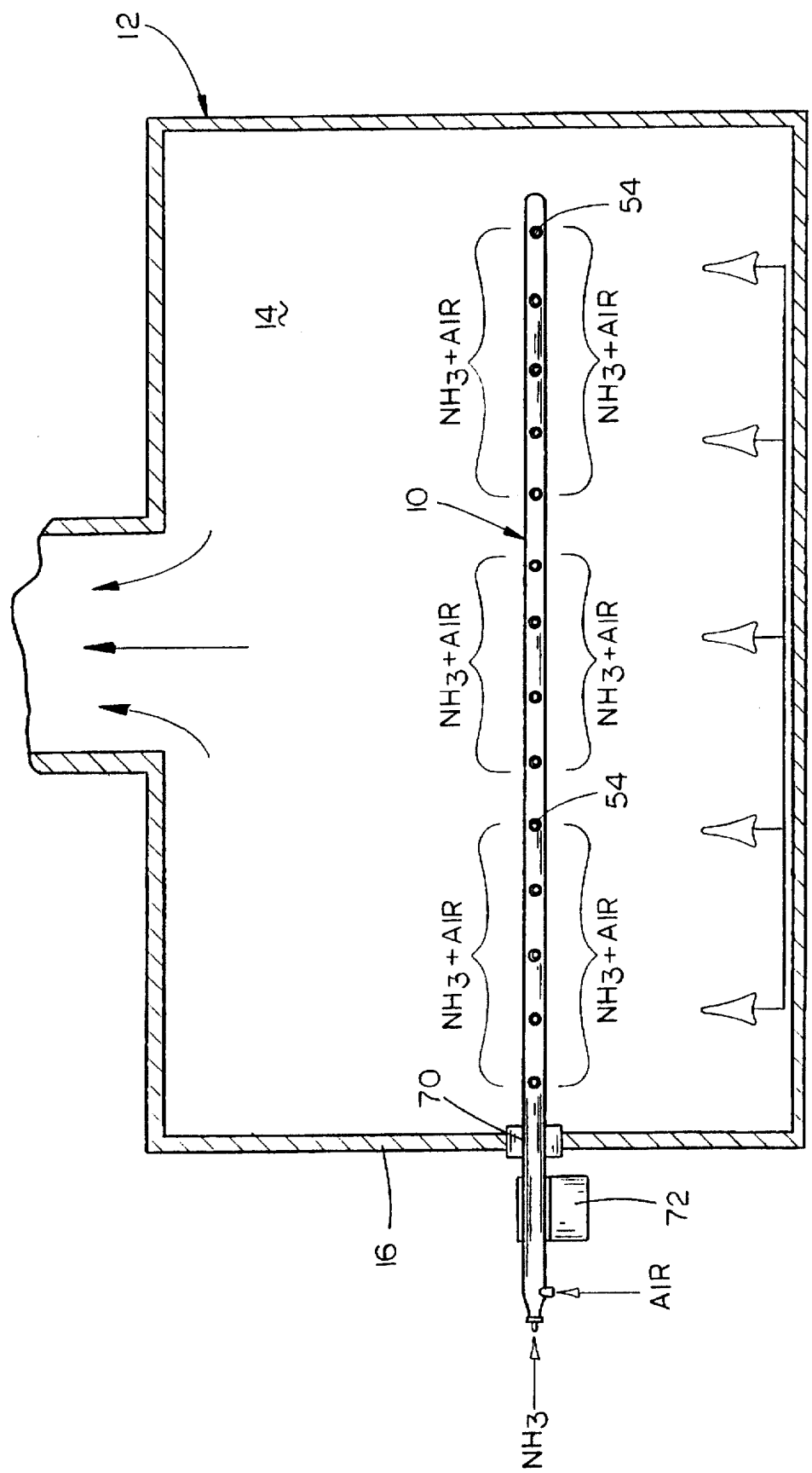
FIG. 1 is a schematic view of a boiler which illustrates the combustion gases passing through the boiler, normal to the lance.
Figure 2:
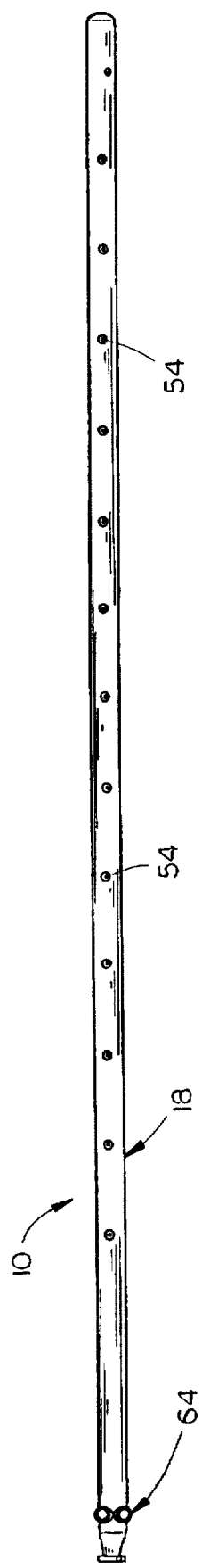
FIG. 2 is a plan view of the injection lance.
Figure 3:
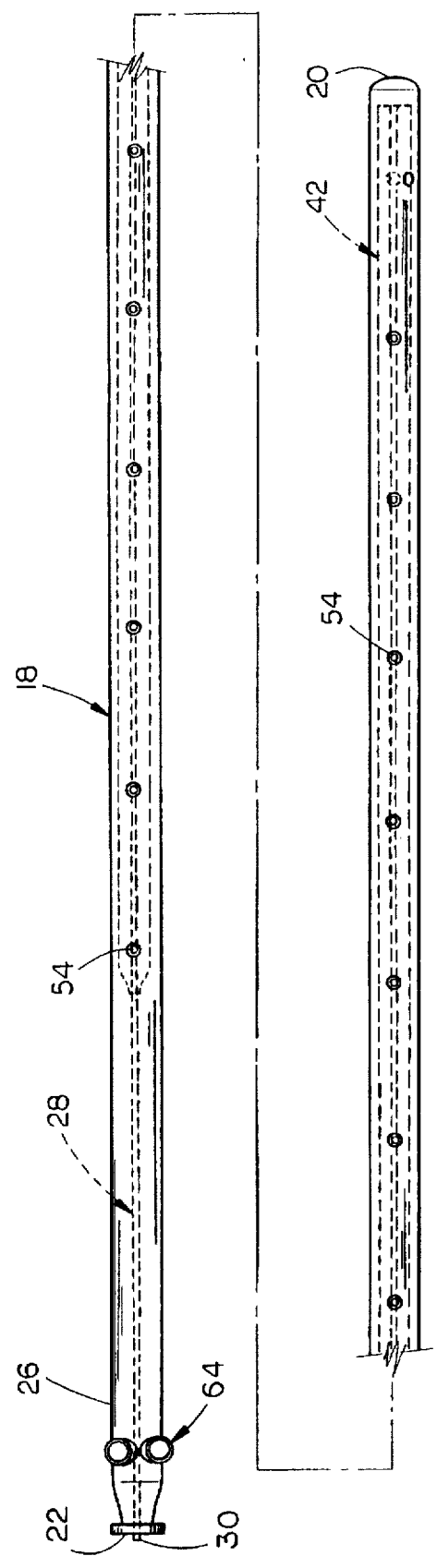
FIG. 3 is an elevational view of the injection lance of this invention.
Figure 4:
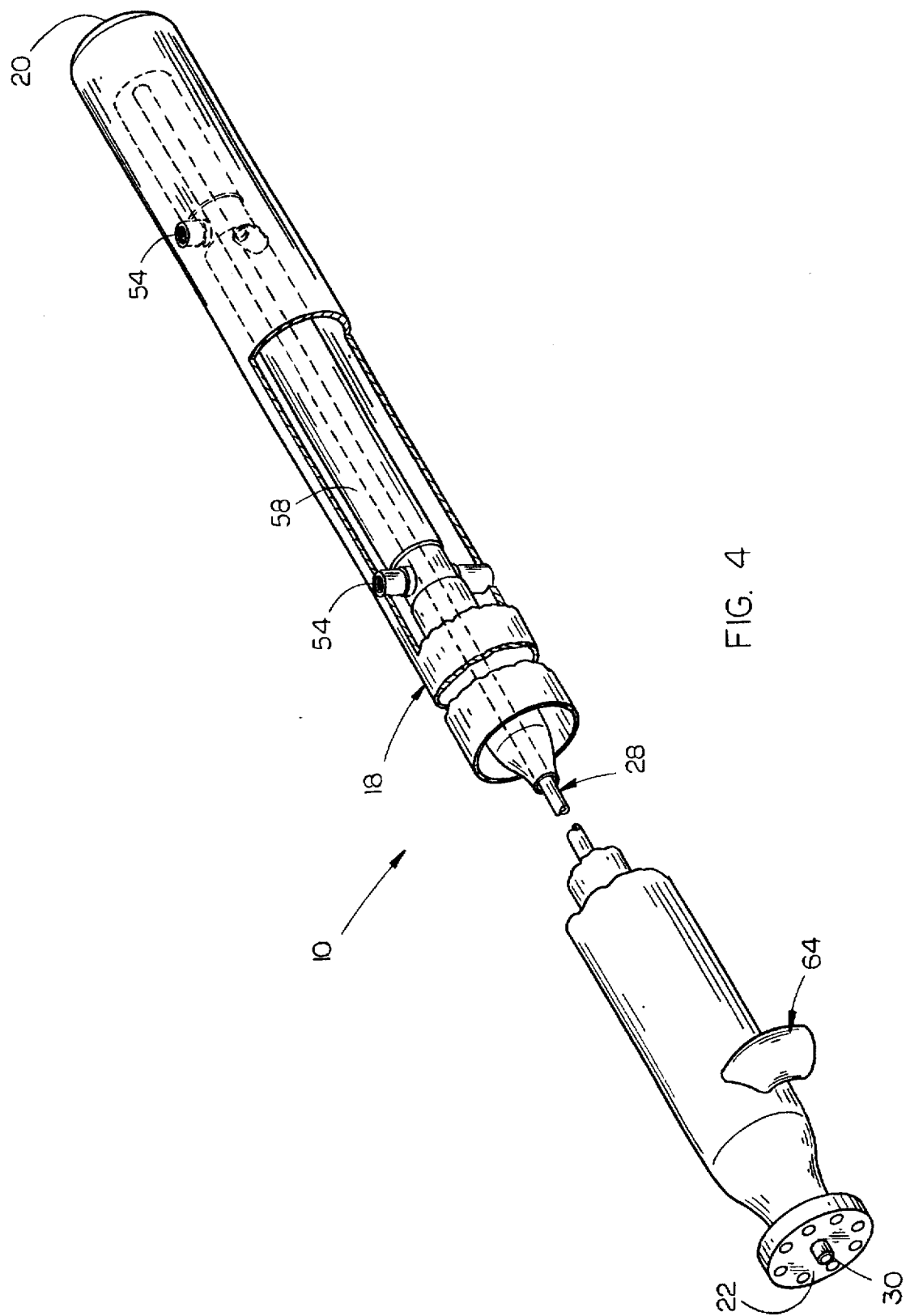
FIG. 4 is a perspective view of the injection lance of this invention with a portion thereof cut away to more fully illustrate the invention.

The ammonia injection lance of this invention is referred to generally by the reference numeral 10 while the reference numeral 12 refers to a furnace or boiler wherein combustion gases containing nitrogen oxides pass through the cavity 14. It should be noted that the combustion gases may pass horizontally through the boiler cavity or may pass vertically through the boiler cavity. Further, the combustion gases may pass through the boiler cavity at an angle with respect to vertical or horizontal. For purposes of description, the furnace or boiler 12 will be described as including a substantially vertically disposed side wall 16 through which the ammonia injection lance 10 movably extends. In FIG. 1, the gases pass horizontally through the boiler cavity as indicated by the arrows.

Figure 5:
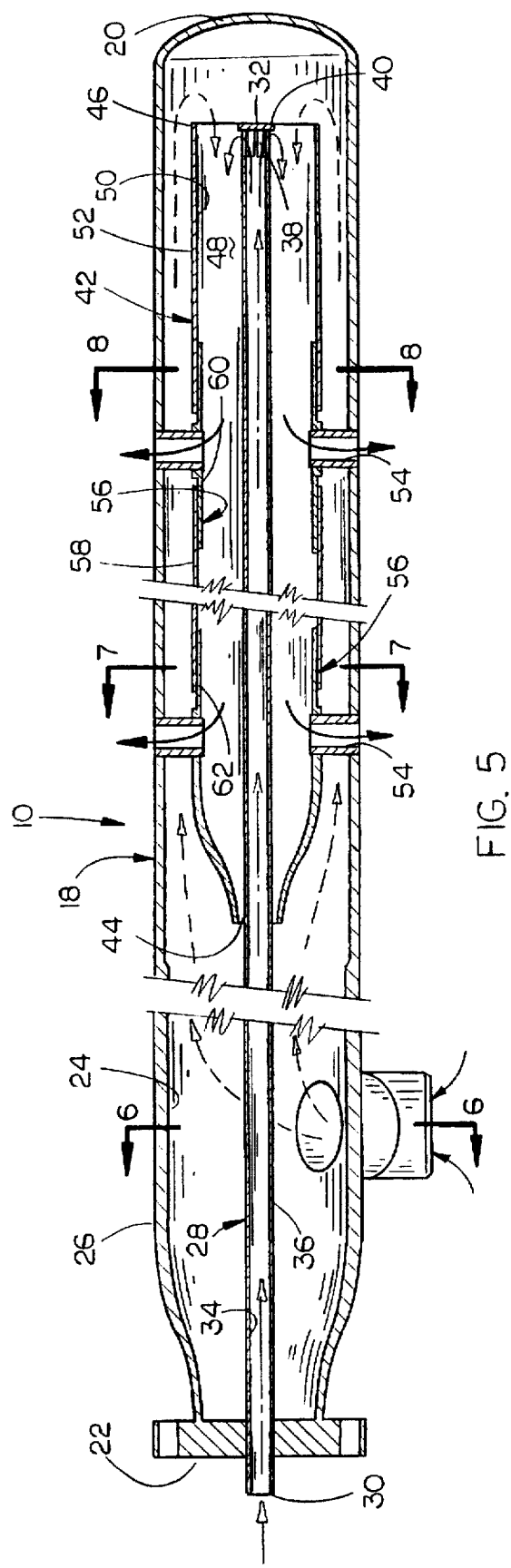
FIG. 5 is an elongated sectional view taken through the injection lance.
Figure 8:
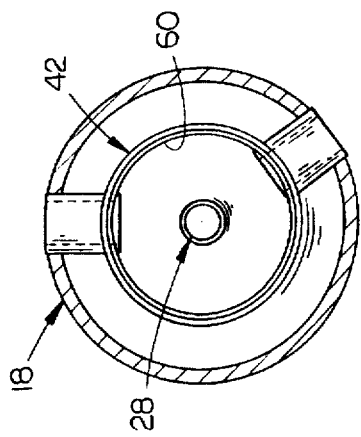
FIG. 8 is a sectional view seen on lines 8—8 of FIG. 5.
Figure 7:
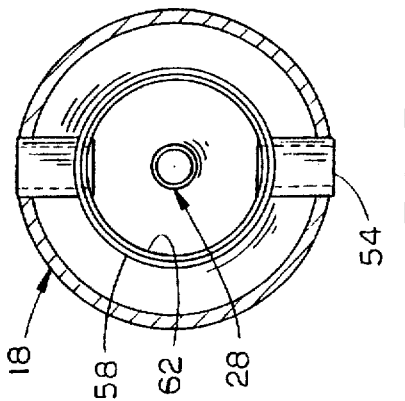
FIG. 7 is a sectional view seen on lines 7—7 of FIG. 5.
Figure 6:
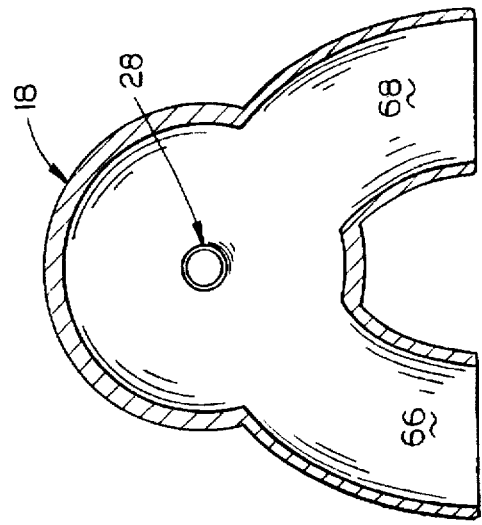
FIG. 6 is a sectional view seen on lines 6—6 of FIG. 5.

Injection lance 10 includes an outer tube 18 having an inner end 20 and an outer end 22. For purposes of description, outer tube 18 will be described as including an interior surface 24 and an exterior surface 26. Lance 10 includes an inner tube 28 including an outer end 30 and an inner end 32. The outer end 30 of inner tube 28 is positioned outwardly of the wall 16, as illustrated in FIG. 1, and is in communication with a source of anhydrous ammonia (NH3) adapted to be passed along the length of the inner tube 28. Although it is preferred that the source of ammonia is anhydrous ammonia, it is perhaps possible that the source of ammonia could be aqueous ammonia. For purposes of description, tube 28 will be described as including an interior surface 34 and an exterior surface 36. As seen in FIG. 5, the inner end 32 of tube 28 is spaced from the inner end of tube 18. The inner end 32 of tube 28 is provided with a means for causing the anhydrous ammonia to be forced in the direction of the arrows as illustrated in FIG. 5. As seen in FIG. 5, the inner end 32 of tube 28 is provided with a plurality of elongated discharge openings 38 and a deflector plate 40. Other means could be utilized as long as the anhydrous ammonia is directed to the left, as viewed in FIG. 5, once the anhydrous ammonia has been discharged from the inner end 32 of the tube 28.

The numeral 42 refers to an intermediate tube having its outer end 44 sealably embracing the exterior surface 36 of tube 28. The inner end 46 of tube 42 is open, as illustrated in FIG. 5, to define an annular passageway 48 between the exterior surface 36 of tube 28 and the interior surface 50 of tube 42. For purposes of description, tube 42 will also be described as comprising an exterior surface 52. A plurality of discharge ports or nozzles 54 are provided, as illustrated in FIG. 5, and extend from the interior surface 50 of tube 42 to the exterior surface 26 of tube 18. Preferably, tube 42 is provided with a plurality of expansion joints referred to generally by the reference numeral 56. The expansion joints 56 permit movement of the tubular portions 58 with respect to the sleeve 60 or the sleeve 62. Expansion joints 56 are preferably provided inasmuch as the tube 18 is exposed to a greater temperature than tube 42. It should be noted, however, that expansion joints may not be needed in all situations.

Tube 18 is provided with an air inlet port 64 which includes inlet portions 66 and 68 which are in communication with a source of air. It should be noted that port 64 may comprise a single inlet portion rather than the two inlet portions if so desired. Injection lance 10 extends through opening 70 in wall 16 and includes a conventional drive 72 adapted to move the lance 10 inwardly into the boiler 12 or outwardly therefrom when it is desired to inspect the condition of the lance or when it is desired to perform maintenance thereon.

In operation, anhydrous ammonia is introduced into the outer end 30 of tube 28 simultaneously with air being introduced into the outer tube 18. The anhydrous ammonia moves through the interior of tube 28 and is discharged therefrom through the openings 38 so that the anhydrous ammonia is delivered into the passageway 48. The air being introduced into tube 18 also moves along the length of the lance between the interior surface 24 of tube 18 and the exterior surface 52 of tube 42, as illustrated by the arrows in FIG. 5. The air enters the open inner end of the tube 42 and moves to the left, as viewed in FIG. 5, in the passageway 48 where it is mixed with the anhydrous ammonia. The anhydrous ammonia-air mixture is then discharged through the discharge ports or nozzles 54 into the flue gas stream where the mixture reacts with the nitrogen oxides therein to reduce the level thereof.

Preferably, the longitudinal axis of the lance is disposed transversely with respect to the flow of the flue gases whether the flue gases are moving horizontally, vertically or a combination thereof. Preferably the nozzles 54 are positioned on the lance 10 so that the ammonia-air mixture is directed into the flue gases at a right angle thereto. Thus, if the flue gases are moving vertically upwardly through the boiler, the longitudinal axes of the nozzles 54 will be horizontally disposed. Conversely, if the flue gases are moving horizontally through the boiler, the longitudinal axes of the nozzles 54 will be vertically disposed.

It is also important to note that the intermediate tube 42 is somewhat insulated from the hot combustion gases due to the fact that outer tube 18 is positioned therearound. Thus, the anhydrous ammonia is insulated from the heat of the boiler until it is discharged into the flue gas stream. The lance 10, by its design, insulates both the ammonia and the air-ammonia mixture from the furnace to provide a mixture which is approximately the same temperature at all the ports or nozzles 54 along the length of the lance 10.

Thus it can be seen that the invention accomplishes at least all of its stated objectives.

We claim:

1. A combination comprising:

a boiler having a flue gas stream moving therethrough;

an injection lance for injecting a mixture of air and ammonia into said flue gas stream in said boiler to reduce nitrogen oxides therein, said injection lance comprising: an elongated outer tube having closed inner and outer ends, an interior surface and an exterior surface; said outer tube being in communication, adjacent to its outer end, with a source of mixing air; an elongated inner tube, having inner and outer ends, centrally positioned in said outer tube, said inner tube having an interior surface, and an exterior surface; said inner end of said inner tube being spaced from said inner end of said outer tube; said inner tube being in fluid communication, adjacent to its outer end, with a source of ammonia whereby the ammonia will pass through the length of said inner tube for discharge from the inner end thereof; an intermediate tube, having inner and outer ends, positioned in said outer tube between said inner tube and said outer tube, said intermediate tube having an interior surface and an exterior surface; said inner end of said intermediate tube being open and being spaced from said inner end of said outer tube; said interior surface of said outer tube and said exterior surface of said intermediate tube defining a first passageway; said interior surface of said intermediate tube and said exterior surface of said inner tube defining a second passageway; said outer end of said intermediate tube sealably embracing said inner tube inwardly of the location where said mixing air enters said outer tube whereby said mixing air passes towards said inner end of said outer tube in said first passageway and then passes into said open inner end of said intermediate tube and into said second passageway; means at the inner end of said inner tube for directing the ammonia passing therefrom into said second passageway so that the ammonia will mix with the mixing air passing therethrough; and a plurality of spaced-apart discharge ports extending from the interior surface of said intermediate tube to the exterior surface of said outer tube whereby the ammonia-air mixture present between said inner tube and said intermediate tube will be discharged into the flue gas stream.

2. The combination of claim 1 wherein said means at the inner end of said inner tube comprises a plurality of openings formed in said inner end of said inner tube and a deflector plate inwardly of said plurality of openings.

3. The combination of claim 1 wherein said boiler includes a vertical wall and wherein said injection lance extends substantially horizontally through said boiler wall.

4. The combination of claim 3 wherein said lance includes means for moving said lance into said boiler and outwardly therefrom.

5. The combination of claim 3 wherein said ammonia enters said inner tube at a point outwardly of said boiler.

6. The combination of claim 3 wherein said air enters said outer tube outwardly of said boiler.

7. The combination of claim 1 wherein said outer tube has a multiple-port inlet which is in communication with said source of mixing air.

8. The combination of claim 1 wherein said intermediate tube includes at least one expansion joint therein.

9. The combination of claim 1 wherein said intermediate tube includes a plurality of expansion joints therein.

10. The combination of claim 1 wherein said lance has a longitudinal axis which is substantially transversely disposed with respect to the direction of movement of the flue gas stream moving through said boiler.

11. The combination of claim 10 wherein said discharge ports are oriented on said lance so that the ammonia-air mixture is discharged into the flue gas stream substantially transversely with respect thereto.

12. The combination of claim 1 wherein said source of ammonia comprises a source of anhydrous ammonia.

13. The combination of claim 1 wherein the spacing of said intermediate tube with respect to said outer tube and the spacing of said inner tube with respect to said intermediate tube is constructed and arranged such that the temperature of the ammonia-air mixture being discharged into the flue gas stream will be approximately the same along the length of said lance.

* * * * *